(12) United States Patent
Chen et al.

(10) Patent No.: US 11,343,213 B2
(45) Date of Patent: May 24, 2022

(54) METHOD FOR GENERATING REPUTATION VALUE OF SENDER AND SPAM FILTERING METHOD

(71) Applicant: LUNKR TECHNOLOGY (GUANGZHOU) CO., LTD., Guangdong (CN)

(72) Inventors: Leihua Chen, Guangdong (CN); Qingfeng Pan, Guangdong (CN)

(73) Assignee: LUNKR TECHNOLOGY (GUANGZHOU) CO., LTD., Guangzhou (CN)

( * ) Notice: Subject to any disclaimer, the term of this patent is extended or adjusted under 35 U.S.C. 154(b) by 33 days.

(21) Appl. No.: 16/924,263

(22) Filed: Jul. 9, 2020

(65) Prior Publication Data

US 2020/0344191 A1    Oct. 29, 2020

Related U.S. Application Data

(63) Continuation-in-part of application No. PCT/CN2019/070224, filed on Jan. 3, 2019.

(30) Foreign Application Priority Data

Jan. 9, 2018 (CN) .......................... 201810019589.8

(51) Int. Cl.
*H04L 5/12* (2006.01)
*H04L 51/00* (2022.01)

(52) U.S. Cl.
CPC .................................. *H04L 51/12* (2013.01)

(58) Field of Classification Search
None
See application file for complete search history.

(56) References Cited

U.S. PATENT DOCUMENTS 9,519,682 B1 * 12/2016 Pujara ................... H04H 20/28
2005/0091320 A1 * 4/2005 Kirsch .................... H04L 51/12
709/206

(Continued)

FOREIGN PATENT DOCUMENTS

CN    106341303 A    *  1/2017
CN    106341303 B       5/2019

OTHER PUBLICATIONS

CN106341303A English Human Translation (Year: 2017).*

*Primary Examiner* — June Sison

(57) ABSTRACT

A method for generating a reputation value of a sender includes: obtaining non-spam logs in a specified period; calculating an initial reputation value of a target sender according to sender identifications and recipient identifications of the non-spam logs as well as the number of emails sent by senders of the non-spam logs; calculating a transferred reputation value of the target sender according to the sender identifications of the non-spam logs and the number of the emails sent by the senders of the non-spam logs; and calculating a current reputation value of the target sender according to the initial reputation value and the transferred reputation value of the target sender. The method can accurately calculate the reputation value of the sender without relying on an email sending history of the sender, thereby effectively preventing the reputation value of the sender from being increased by cheating.

6 Claims, 1 Drawing Sheet

(56) References Cited

U.S. PATENT DOCUMENTS

| | | | |
|---|---|---|---|
| 2008/0140781 A1* | 6/2008 | Bocharov | G06Q 10/107 709/206 |
| 2009/0013054 A1* | 1/2009 | Libbey | G06Q 10/107 709/207 |
| 2009/0037469 A1* | 2/2009 | Kirsch | G06Q 10/107 |
| 2010/0005146 A1* | 1/2010 | Drako | G06Q 10/00 709/206 |
| 2012/0030293 A1* | 2/2012 | Bobotek | G06Q 10/10 709/206 |

* cited by examiner

METHOD FOR GENERATING REPUTATION VALUE OF SENDER AND SPAM FILTERING METHOD

CROSS REFERENCE

The present application is a Continuation-in-part Application of PCT application No. PCT/CN2019/070224 filed on Jan. 3, 2019, which claims the benefit of Chinese Patent Application No. 201810019589.8 filed on Jan. 9, 2018, the contents of which are hereby incorporated by reference.

TECHNICAL FIELD

The present invention relates to the field of email technologies, and in particular, to a method for generating a reputation value of a sender and a spam filtering method.

BACKGROUND

The wide application of emails is accompanied with a more serious spam problem. The spam not only consumes network resources, occupies network bandwidth, and wastes precious time and Internet expenses of users, but also severely threatens the network security. It has become a public nuisance on the Internet and causes considerable economic losses. A survey report published by the anti-spam center of the Internet Society of China shows that spam is increasingly growing in scale, and on average, spam accounts for 55.65% of emails received by Chinese netizens weekly. It is of an urgent need to develop an effective technology to solve the problem of overwhelming spam.

Filtering technologies for the current spam mainly include email sending authentication, blacklist and whitelist, content filtering technology, fingerprint technology, Bayesian filtering technology, and the like. However, all these technologies have some disadvantages, and cannot achieve 100% accurate judgment. According to a method for generating reputation of a sender based on an email user behavior in the Patent Application No. 201510401224.8, massive logs generated online are analyzed by using a machine learning method, to select multiple feature dimensions such as an email body size, the number of successful email deliveries, the number of email delivery failures, the total number of sent emails, the number of recipient replies, email content, sender domain names, and the number of successful email deliveries and the number of email delivery failures of an IP address. A feature model is trained using massive logs, and a general reputation value database is generated for these feature values. A real-time email is matched with the feature reputation database. A sender-specific reputation value is generated for a sender meeting the condition, thus improving the accuracy of the reputation value. However, the foregoing method for generating reputation of a sender relies on an email sending history of the corresponding sender. As a result, a batch of special email boxes can be prepared through account maintenance. In a period of time, a batch of normal emails are sent to email boxes controlled by the sender, to improve the reputation of the sender; or while sending spam emails, the sender sends some normal emails to the email boxes controlled by the sender, to offset the decrease in the reputation of the sender caused by the sending of spam emails.

SUMMARY

An objective of the present invention is to provide a method for generating a reputation value of a sender, and a spam filtering method. The reputation value of the sender can be calculated accurately without relying on an email sending history of the sender, thereby effectively preventing the reputation value of the sender from being increased by cheating.

To resolve the above problem, embodiments of the present invention provide a method for generating a reputation value of a sender, including:

obtaining non-spam logs in a specified period;

calculating an initial reputation value of a target sender according to sender identifications and recipient identifications of the non-spam logs as well as the number of emails sent by senders of the non-spam logs;

calculating a transferred reputation value of the target sender according to the sender identifications of the non-spam logs and the number of the emails sent by the senders of the non-spam logs; and calculating a current reputation value of the target sender according to the initial reputation value and the transferred reputation value of the target sender.

Preferably, the calculating an initial reputation value of a target sender according to sender identifications and recipient identifications of the non-spam logs as well as the number of emails sent by senders of the non-spam logs specifically includes:

collecting statistics on the sender identifications and the recipient identifications of the non-spam logs as well as the number of the sent emails to create a first data table, where the first data table includes primary keys of the sender identifications and primary keys of the recipient identifications;

counting the number of the primary keys of the sender identifications and the recipient identifications; and calculating the initial reputation value of the target sender according to the number of the primary keys of the sender identifications and the recipient identifications and a preset total reputation value, where the preset total reputation value is a sum of initial reputation values of all the senders of the non-spam logs.

Preferably, the calculating the initial reputation value of the target sender according to the number of the primary keys of the sender identifications and recipient identifications and a preset total reputation value specifically includes:

calculating the initial reputation value of the target sender according to the following formula: reputation=N/M, where N is the preset total reputation value, and M is the number of the primary keys of the sender identifications and recipient identifications.

Preferably, the calculating a transferred reputation value of the target sender according to the sender identifications of the non-spam logs and the number of the emails sent by the senders of the non-spam logs specifically includes:

collecting statistics on the sender identifications of the non-spam logs and the number of the sent emails of the non-spam logs to create a second data table, where the second data table includes the primary keys of the sender identifications;

counting, in the first data table, the numbers of emails sent by the target sender to multiple recipients respectively;

counting, in the second data table, the total number of emails sent by the target sender to the external; and calculating the transferred reputation value of the target sender according to current reputation values of the multiple recipients, the numbers of the emails sent by the target sender to the multiple recipients respectively, and the total number of the emails sent by the target sender to the external.

Preferably, the calculating the transferred reputation value of the target sender according to current reputation values of the multiple recipients, the numbers of the emails sent by the target sender to the multiple recipients respectively, and the total number of the emails sent by the target sender to the external specifically includes:

calculating the transferred reputation value of the target sender according to the following formula:

$$\text{delta}=\text{reputation}_1 \times (n_1/\text{total}) + \text{reputation}_2 \times (n_2/\text{total}) * * * \text{reputation}_i \times (n_i/\text{total}) * * * \text{reputation}_m \times (n_m/\text{total}),$$

where reputation$_i$ is a current reputation value of an $i^{th}$ recipient, $n_i$ is the number of emails sent by the target sender to the $i^{th}$ recipient, and total represents the total number of emails sent by the target sender to the external.

Preferably, the calculating a current reputation value of the target sender according to the initial reputation value and the transferred reputation value of the target sender specifically includes:

calculating the current reputation value of the target sender according to the following formula: reputation'=reputation×(N/(N+delta)).

Preferably, the method for generating a reputation value of a sender further includes:

creating a sender reputation table according to the current reputation value of the target sender, where the sender reputation table includes the primary keys of the sender identifications.

Preferably, the sender identification is a sender email address and/or a sender domain name.

Embodiments of the present invention further provide a spam filtering method, including:

generating a current reputation value of a sender by using the above method for generating a reputation value of a sender;

determining whether an email sent by the sender is a spam email according to the current reputation value of the sender; and determining that the email sent by the sender is a spam email when the current reputation value of the sender is less than a preset threshold, and filtering the email sent by the sender.

Compared with the prior art, a method for generating a reputation value of a sender provided in the embodiments of the present invention achieves the following beneficial effects: The method for generating a reputation value of a sender includes obtaining non-spam logs in a specified period; calculating an initial reputation value of a target sender according to sender identifications and recipient identifications of the non-spam logs as well as the number of emails sent by senders of the non-spam logs; calculating a transferred reputation value of the target sender according to the sender identifications of the non-spam logs and the number of the emails sent by the senders of the non-spam logs; and calculating a current reputation value of the target sender according to the initial reputation value and the transferred reputation value of the target sender. The method for generating a reputation value of a sender can accurately calculate the reputation value of the sender without relying on an email sending history of the sender, thereby effectively preventing the reputation value of the sender from being increased by cheating. An embodiment of the present invention provides a spam filtering method.

DESCRIPTION OF EMBODIMENTS

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention. All other embodiments obtained by a person of ordinary skill in the art based on the embodiments of the present invention without creative efforts shall fall within the protection scope of the present invention.

Figure 1:
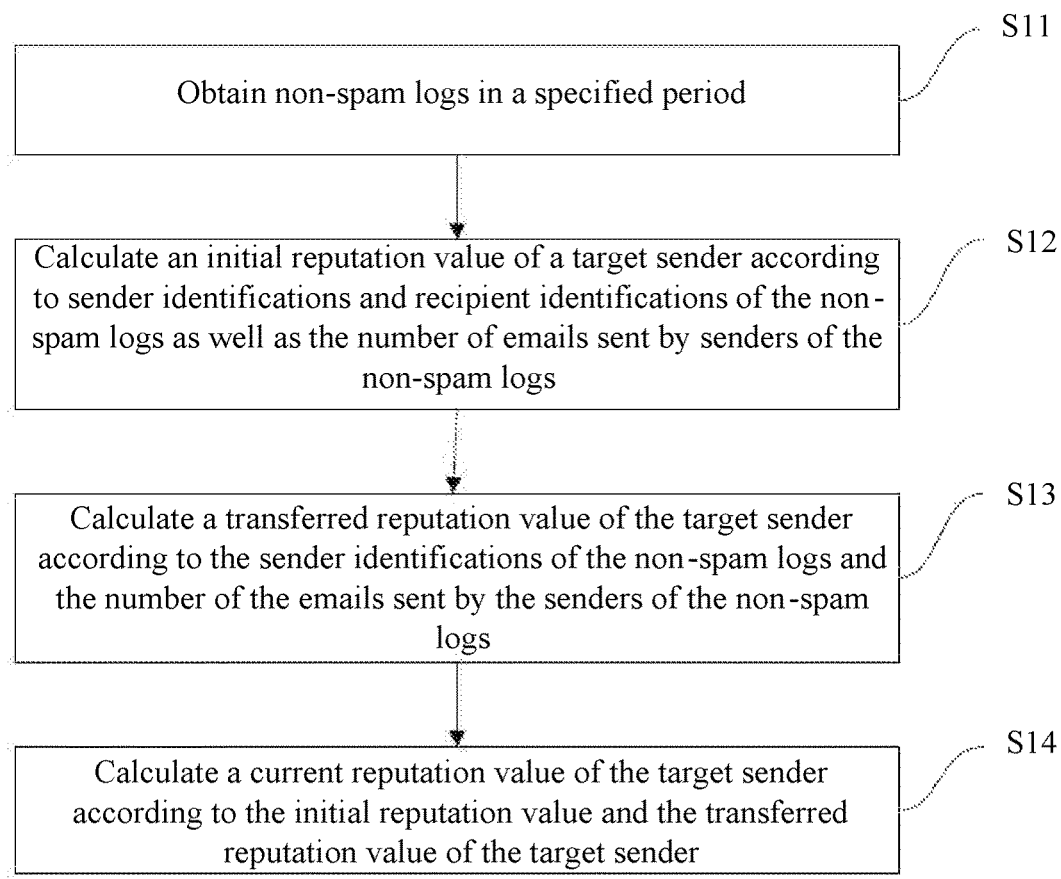
FIG. 1 is a flowchart of a method for generating a reputation value of a sender according to an embodiment of the present invention.

Referring to FIG. 1, FIG. 1 is a flowchart of a method for generating a reputation value of a sender according to an embodiment of the present invention. The method for generating a reputation value of a sender includes the following steps:

S11: obtain non-spam logs in a specified period.

By scanning system logs in the specified period and eliminating logs that have been determined as spam, the non-spam logs in the specified period are obtained. That is, during calculation of a reputation value of a sender, logs determined as spam are not involved in the calculation. By eliminating spam logs in advance, unnecessary technical processes can be avoided. Moreover, impact of emails determined as spam emails on the reputation value of the sender is avoided, thereby improving the accuracy of the calculated reputation value of the sender.

S12: calculate an initial reputation value of a target sender according to sender identifications and recipient identifications of the non-spam logs as well as the number of emails sent by senders of the non-spam logs.

S13: calculate a transferred reputation value of the target sender according to the sender identifications of the non-spam logs and the number of the emails sent by the senders of the non-spam logs.

S14: calculate a current reputation value of the target sender according to the initial reputation value and the transferred reputation value of the target sender.

The initial reputation value and the transferred reputation value of the sender are calculated by selecting, from the non-spam logs, the sender identifications, the recipient identifications and the number of the emails sent by the senders, and the current reputation value of the target sender is calculated according to the initial reputation value and the transferred reputation value. The reputation value of the sender can be calculated accurately without relying on the email sending history of the sender, thereby effectively preventing the reputation value of the sender from being increased by cheating.

In an optional embodiment, S12 of calculating an initial reputation value of a target sender according to sender identifications and recipient identifications of the non-spam logs as well as the number of emails sent by senders of the non-spam logs specifically includes:

collecting statistics on the sender identifications and the recipient identifications of the non-spam logs as well as the number of the sent emails of the non-spam logs to create a first data table, where the first data table includes primary keys of the sender identifications and primary keys of the recipient identifications;

counting the number of the primary keys of the sender identifications and the recipient identifications; and calculating the initial reputation value of the target sender according to the number of the primary keys of the sender identifications and the recipient identifications and a preset total reputation value, where the preset total reputation value is a sum of initial reputation values of all the senders of the non-spam logs.

In an optional embodiment, the calculating the initial reputation value of the target sender according to the number of the primary keys of the sender identifications and the recipient identifications and a preset total reputation value specifically includes:

calculating the initial reputation value of the target sender according to the following formula: reputation=N/M;

where N is the preset total reputation value, and M is the number of the primary keys of the sender identifications and recipient identifications.

In an optional embodiment, S13 of calculating a transferred reputation value of the target sender according to the sender identifications of the non-spam logs and the number of the emails sent by the senders of the non-spam logs specifically includes:

collecting statistics on the sender identifications of the non-spam logs and the number of the sent emails of the non-spam logs to create a second data table, where the second data table includes the primary keys of the sender identifications;

counting, in the first data table, the numbers of emails sent by the target sender to multiple recipients respectively;

counting, in the second data table, the total number of emails sent by the target sender to the external; and calculating the transferred reputation value of the target sender according to current reputation values of the multiple recipients, the numbers of the emails sent by the target sender to the multiple recipients respectively, and the total number of the emails sent by the target sender to the external.

Because a recipient may fail to receive an email sent by the sender, that is, the email of the sender may be lost, the sum of the numbers of the emails sent by the target sender to the multiple recipients respectively in the first data table is not equal to the total number of the emails sent by the target recipient to the external. The total number of the emails sent by the target recipient to the external needs to be counted separately by using the created second data table, to avoid omissions in counting the total number of the emails sent by the target sender.

In an optional embodiment, the calculating the transferred reputation value of the target sender according to current reputation values of the multiple recipients, the numbers of the emails sent by the target sender to the multiple recipients respectively, and the total number of the emails sent by the target sender to the external specifically includes:

calculating the transferred reputation value of the target sender according to the following formula:

$$\text{delta} = \text{reputation}_1 \times (n_1/\text{total}) - \text{reputation}_2 \times (n_2/\text{total}) * * * \text{reputation}_i \times (n_i/\text{total}) * * * \text{reputation}_m \times (n_m/\text{total});$$

where reputation$_i$ is a current reputation value of an $i^{th}$ recipient, $n_i$ is the number of emails sent by the target sender to the $i^{th}$ recipient, and total represents the total number of emails sent by the target sender to the external.

In this embodiment, the transferred reputation value of the target sender is calculated according to the current reputation values of the multiple recipients, the numbers of the emails sent by the target sender to the multiple recipients respectively, and the total number of the emails sent by the target sender to the external, so that the reputation value of the sender is transferred to the recipient based on an email sending ratio of the sender, thereby improving the accuracy of the transferred reputation value. For example, a sender A sends emails to a recipient B; if 1/10 of emails sent by the sender A are sent to the sender B, 1/10 of the reputation value of the sender A is transferred to the sender B.

In an optional embodiment, S14 of calculating a current reputation value of the target sender according to the initial reputation value and the transferred reputation value of the target sender specifically includes:

calculating the current reputation value of the target sender according to the following formula: reputation'=reputation×(N/(N+delta)).

In an optional embodiment, the method for generating a reputation value of a sender further includes:

creating a sender reputation table according to the current reputation value of the target sender, where the sender reputation table includes the primary keys of the sender identifications.

According to the method for generating reputation of a sender, all senders are enumerated, and the reputation of each sender is transferred to relevant recipients. After iteration is completed, reputation values of all senders that have received emails are increased. That is, a total reputation value corresponding to all the senders in the specified period is increased by delta (because the reputation value of the sender A does not decrease after the sender A transfers the reputation value to the sender B, it means that an additional reputation value is created and assigned to the sender B; therefore, the total reputation value corresponding to all the senders in the specified period is increased by delta). The total reputation value added in the current iteration is recorded with N as follows: N'=N+delta, so that the total reputation value corresponding to all the senders in the specified period is as follows: total reputation value N'=N+delta>1. To restore the current total reputation value of all the senders to N, the reputation value of each sender is updated as follows: reputation'=reputation×(N/(N+delta)). This is equivalent to reducing the reputation value of each sender proportionally, until the total reputation value is restored to N. Such an iteration finally causes the reputation of each sender to converge gradually. When a variation of sender reputation caused by two iterations is less than a specific threshold, it indicates that the reputation is converged sufficiently, and the iteration is finished. At this point, the sender reputation table records the required sender reputation value of each sender. It can be learned from the calculation process above that, if an email box keeps sending emails without receiving any email, an initial reputation value of the email box is N/M, and then in each iteration, no reputation value is added to the email box by other senders; moreover, the reputation value is reduced proportionally at the end of each iteration. Therefore, after iterative convergence, the reputation value of the sender is extremely small, which is close to 0.

For example, a cheater sends a large number of emails to an email box D through an email box C controlled by the cheater. It can be learned by calculating reputation values of the email box C and the email box D by means of the method for generating a reputation value of a sender that, because no other email box with reputation has ever sent an email to the email box C, the reputation value of the email box C is close to 0. Therefore, a transferred reputation value from the email box C to the email box D is 0. Even though the email box C sends a large number of emails to the email box D, the reputation value N/M obtained by the email box D is close to 0 after multiple iterations, and the reputation value of the email box D cannot be improved.

In an optional embodiment, the sender identification is a sender email address and/or a sender domain name.

By calculating a reputation value of the sender email address, the accuracy of spam control for a personal email box can be improved. By calculating a reputation value of the sender domain name, for some new email boxes that have not appeared in a system before, spam control can be loosened because the reputation value of the sender domain name is high enough. The accuracy and flexibility of spam control for email boxes can be improved according to the reputation value of the sender email address and/or the reputation value of the sender domain name, thereby greatly reducing misjudgment of spam.

Figure 2:
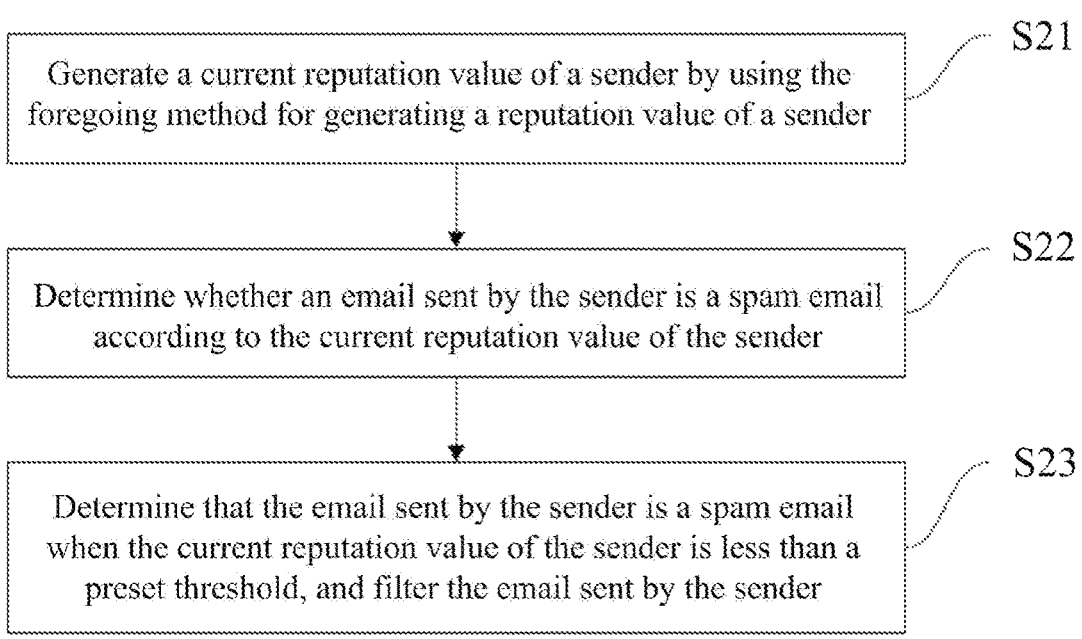
FIG. 2 is a flowchart of a spam filtering method according to an embodiment of the present invention.

Referring to FIG. 2, FIG. 2 is a flowchart of a spam filtering method according to an embodiment of the present invention. The spam filtering method includes the following steps:

S21: generate a current reputation value of a sender by using the foregoing method for generating a reputation value of a sender.

S22: determine whether an email sent by the sender is a spam email according to the current reputation value of the sender.

S23: determine that the email sent by the sender is a spam email when the current reputation value of the sender is less than a preset threshold, and filter the email sent by the sender.

A reputation value of a sender email address and a reputation value of a sender domain name are calculated respectively by using the foregoing method for generating a reputation value of a sender, so that the accuracy of spam control for a personal email box can be improved. For some new email boxes that have not appeared in a system before, spam control can be loosened because the reputation value of the sender domain name is high enough. The accuracy and flexibility of spam control for email boxes can be improved, thereby greatly reducing misjudgment of spam.

Compared with the prior art, a method for generating a reputation value of a sender provided in the embodiments of the present invention achieves the following beneficial effects: The method for generating a reputation value of a sender includes obtaining non-spam logs in a specified period of time; calculating an initial reputation value of a target sender according to sender identifications and recipient identifications of the non-spam logs as well as the number of emails sent by senders of the non-spam logs; calculating a transferred reputation value of the target sender according to the sender identifications of the non-spam logs and the number of the emails sent by the senders of the non-spam logs; and calculating a current reputation value of the target sender according to the initial reputation value and the transferred reputation value of the target sender. The method for generating a reputation value of a sender can accurately calculate the reputation value of the sender without relying on an email sending history of the sender, thereby effectively preventing the reputation value of the sender from being increased by cheating. An embodiment of the present invention further provides a spam filtering method.

The above descriptions are merely preferred implementations of the present invention. It should be noted that a person of ordinary skill in the art may further make several improvements and modifications without departing from the principle of the present invention, but such improvements and modifications should be deemed as falling within the protection scope of the present invention.

The invention claimed is:

1. A spam filtering method, comprising:
generating a current reputation value of a sender by using the method for generating a reputation value of a sender according to a method for generating a reputation value of a sender;
determining whether an email sent by the sender is a spam email according to the current reputation value of the sender; and
determining that the email sent by the sender is a spam email when the current reputation value of the sender is less than a preset threshold, and filtering the email sent by the sender;
wherein the method for generating a reputation value of a sender comprises:
obtaining non-spam logs in a specified period:
calculating an initial reputation value of a target sender according to sender identifications and recipient identifications of the non-spam logs as well as the number of emails sent by senders of the non-spam logs specifically comprises:
collecting statistics on the sender identifications and the recipient identifications of the non-spam logs as well as the number of the sent emails of the non-spam logs to create a first data table wherein the first data table comprises primary keys of the sender identifications and primary keys of the recipient identifications;
counting the number of the primary keys of the sender identifications and the recipient identifications; and
calculating the initial reputation value of the target sender according to the number of the primary keys of the sender identifications and the recipient identifications and a preset total reputation value, wherein the preset total reputation value is a sum of initial reputation values of all the senders of the non-spam logs;
calculating a transferred reputation value of the target sender according to the sender identifications of the non-spam logs and the number of the emails sent by the senders of the non-spam logs specifically comprises:
collecting statistics on the sender identifications of the non-spam logs and the number of the sent emails of the non-spam logs to create a second data table wherein the second data table comprises the primary keys of the sender identifications:
counting, in the first data table, the numbers of emails sent by the target sender to multiple recipients respectively;
counting, in the second data table, the total number of emails sent by the target sender to the external; and
calculating the transferred reputation value of the target sender according to current reputation values of the multiple recipients, the numbers of the emails sent by the target sender to the multiple recipients respectively, and the total number of the emails sent by the target sender to the external; and
calculating a current reputation value of the target sender according to the initial reputation value and the transferred reputation value of the target sender;
wherein the obtaining non-spam logs in a specified period comprises:
scanning system logs in the specified period and eliminating logs that have been determined as spam.

2. The spam filtering method according to claim 1, wherein the calculating the initial reputation value of the target sender according to the number of the primary keys of the sender identifications and the recipient identifications and a preset total reputation value specifically comprises:

calculating the initial reputation value of the target sender according to the following formula: reputation=N/M.

3. The spam filtering method according to claim 1, wherein the calculating the transferred reputation value of the target sender according to current reputation values of the multiple recipients, the numbers of the emails sent by the target sender to the multiple recipients respectively, and the total number of the emails sent by the target sender to the external specifically comprises:

calculating the transferred reputation value of the target sender according to the following formula:

$$delta = reputation_1 \times (n_1/total) + reputation_2 \times (n_2/total) * * * reputation_i \times (n_i/total) * * * reputation_m \times (n_m/total),$$

wherein reputation$_i$ is a current reputation value of an $i^{th}$ recipient, $n_i$ is the number of emails sent by the target sender to the $i^{th}$ recipient, and total represents the total number of emails sent by the target sender to the external.

4. The spam filtering method according to claim 3, wherein the calculating a current reputation value of the target sender according to the initial reputation value and the transferred reputation value of the target sender specifically comprises:

calculating the current reputation value of the target sender according to the following formula: reputation'=reputationX(N/(N+delta)).

5. The spam filtering method according to claim 1, further comprising:

creating a sender reputation table according to the current reputation value of the target sender, wherein the sender reputation table comprises the primary keys of the sender identifications.

6. The spam filtering method according to claim 1, wherein the sender identification is a sender email address and/or a sender domain name.

* * * * *